United States Patent [19]

Ortwein

[11] Patent Number: 4,830,044
[45] Date of Patent: May 16, 1989

[54] PIPING CONNECTOR

[76] Inventor: Ernst-Georg Ortwein, Hauptstrasse 23, D-7333 Ebersbach/Fils, Fed. Rep. of Germany

[21] Appl. No.: 162,760
[22] Filed: Mar. 1, 1988
[51] Int. Cl.4 .............................................. F16K 27/08
[52] U.S. Cl. .................................... 137/382; 137/233; 251/89.5; 251/149.9
[58] Field of Search ............... 137/377, 381, 382, 233; 251/292, 89.5, 149.9

[56] References Cited

U.S. PATENT DOCUMENTS

| | | | |
|---|---|---|---|
| 569,439 | 10/1896 | Graafeilund | 251/292 |
| 1,015,094 | 1/1912 | Stift | 251/292 |
| 1,205,849 | 11/1916 | Bowden | 137/233 |
| 2,602,351 | 7/1952 | Ringler et al. | 251/292 |
| 3,901,268 | 8/1975 | Mullins | 137/382 |
| 3,970,284 | 7/1976 | Cobbe, Jr. | 251/149.9 |
| 4,383,548 | 5/1983 | Durenec et al. | 251/291 |
| 4,552,333 | 12/1985 | Niemi | 251/149.9 |

FOREIGN PATENT DOCUMENTS 792202 3/1958 United Kingdom ............... 251/89.5

Primary Examiner—A. Michael Chambers
Attorney, Agent, or Firm—Nils H. Ljungman

[57] ABSTRACT

This invention relates to a piping connector, which is used, in particular, for the provisional closing off of water connections in buildings under construction. To make possible a specified flushing of the pipes closed with the sealing plugs, the piping connector exhibits a housing which can be connected to a piping connection point, with a screw-on connector on one end so that it can be screwed to the piping connection point in question, and a water shut-off mechanism on the opposite end, which is protected by means of a screw-on cover.

18 Claims, 1 Drawing Sheet

PIPING CONNECTOR

BACKGROUND OF THE INVENTION

1. Field of the Invention

The present invention relates to a piping connector. After the preliminary construction work on a structure and the installation of the piping, all of the connection points for sanitation facilities are fitted with so-called construction plugs to protect the connections against the penetration of impurities during plastering and tiling operations. At the same time, however, after they are removed, there must be a certain clearance between the piping connector and the top of the plaster or tile, which is necessary for the unimpeded installation of any extensions which may be necessary after the plastering or tiling, to avoid having to recaulk the tile, plaster or mortar.

2. Description of the Prior Art

Since, from the very beginning of the installation of the piping and extending through the final installation, damage from dirt and corrosion can occur in the piping, it is also necessary to flush the pipes with water or a mixture of water and air. In one appropriate process, a sufficient number of flush water outlets are simultaneously opened during the flushing, to achieve a sufficient flow velocity, and to thereby ensure the removal of impurities.

Until the present invention, however, such flushing operations have been quite complicated processes. First, the water had to be turned off after the hydrostatic test; all the construction plugs (there can be as many as 25 of them even in a small, one family house) had to be removed and replaced by flushing devices, and corresponding pipe nipples with discharge valves had to be screwed on and sealed. After flushing, the same procedure had to be executed in reverse order, i.e., the water turned off, the flushing devices removed and replaced by the so-called construction plugs.

OBJECTS OF THE INVENTION

One object of the present invention is the provision of a piping connector which can be used to close the pipe outlets and may also be used to flush the pipes.

SUMMARY OF THE INVENTION

The present invention provides a pipe connector which makes it possible to easily:
flush pipelines;
plug pipe inlets and outlets after initial installation;
fill shower basins and bathtubs with test water;
dispense water from any pipe outlet; and
remove any air from water lines.

Additionally, the length of the temporary plugs can be increased as desired.

In general, the invention features a piping connector adapted for connection to a pipe, the piping connector comprising: an extension member, the extension member having a throughgoing passage, the throughgoing passage terminating in first and second external openings in the extension member; a connection apparatus for connecting the extension member to a pipe and thereby engaging the throughgoing passage in fluid communication with the pipe through the first external opening; an alterable flow apparatus for altering the flow of fluid through the throughgoing passage; and a cover member, attachable to the extension member, for substantially covering the alterable flow apparatus when the cover member is attached to the extension member.

Other characteristics and appropriate uses of the invention will be described below, with reference to the embodiment illustrated in the accompanying figures, wherein:

DESCRIPTION OF THE PREFERRED EMBODIMENT

Figure 1:
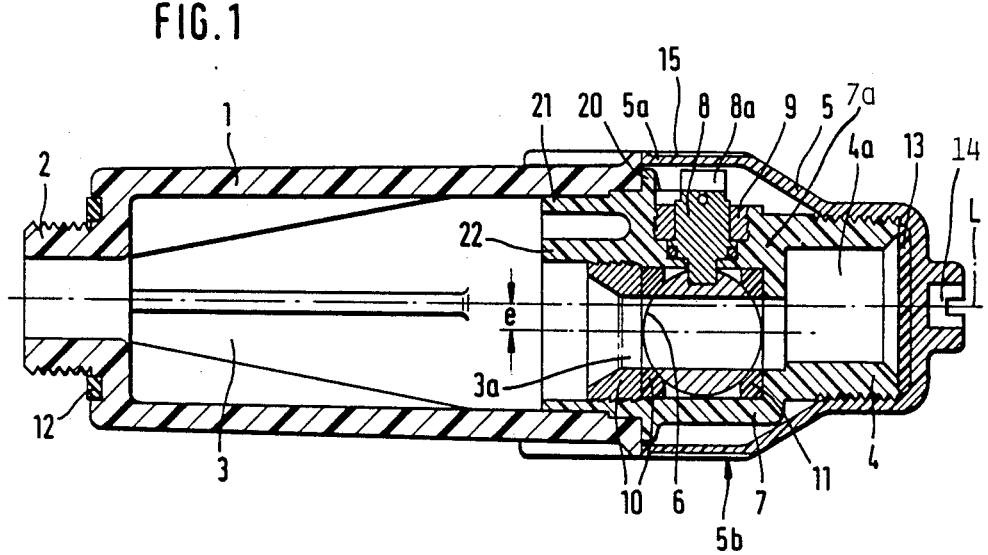
FIG. 1 is a side view of one embodiment of the connector shown in cross section.
Figure 2:
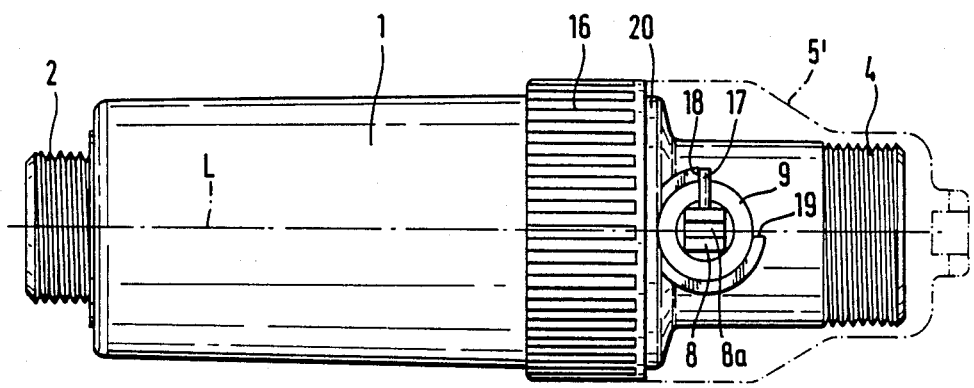
FIG. 2 is a plan view of the parts shown in FIG. 1, not in cross section.
Figure 3:
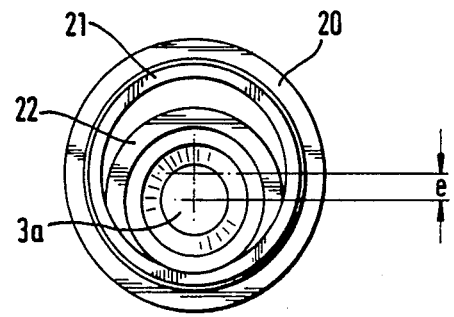
FIG. 3 shows a detail of the insert with the shut-off mechanism, looking through the device.

The piping connector illustrated in FIGS. 1-3 generally includes a housing 1, a threaded connector 2 attached to one end thereof, an internal cavity 3 running through housing 1 in the longitudinal direction, a threaded outlet connector 4 on the other end of housing 1 having a passage 4a, a sealing cover 5 which can be screwed on to housing 1, and a water shut-off mechanism, e.g., in the form of a ball valve 6 provided with a corresponding passage to form a flow connection between the inlet and outlet connectors 2 and 4, respectively.

In one embodiment, there are provided outlet connectors 4, 4a and a water shut-off mechanism 6 mounted on a common component 7, 21 which projects partially into the cavity 3 of the housing 1. Additionally, a sealing cover 5 covers an actuator 8 of the water shut-off mechanism 6, and the open end 5a of sealing cover 5 is also in direct contact with the housing 1 and 16. The component 7, which has integrally formed thereon an extension socket 22, can thus be inserted such that an integrally formed extension 21 slides into the housing 1 and is positioned by a locator 20. If necessary, component 7 can also be attached with adhesive or screwed in.

An open side 5a of sealing cover 5, which extends to and connects with the housing 1, thereby forms an effective protection against the penetration of dirt while the device is in use on the construction site. As is also shown in FIGS. 1 and 3, in one embodiment of the invention, the passage hole 3a of the water shut-off mechanism communicating with the cavity 3 is oriented eccentrically (as shown by a dimension of eccentricity e in FIG. 3) in relation to the longitudinal axis L of the housing, and an actuator 8 is provided with a guide 9 which is inserted in the thicker wall side 7a formed by the eccentricity. Thus, the present invention provides a structurally simple and reliable construction, wherein the guide 9 of the actuator 8 and the guides 10 and 11 of the water shut-off mechanism 6 may be provided as inserts which may be mounted in the corresponding components 7 and 7a, respectively.

As shown in FIG. 1, there are also provided compression seals 12 and 13 mounted, respectively, on the screw extension 2 of the housing 1, and between the outlet connector 4 and the sealing cover 5. Compression seals 12 and 13 ensure a secure water seal, without the necessity of special packing with hemp or a similar material.

For easy operation of the entire apparatus, there is provided a service tool 14 which may be used to engage the spigot 8a of the actuator 8 of the water shut-off mechanism 6. Moreover, the outside 5b of the sealing cover 5, at its open end 5a, is provided with ribs 15 or a similar arrangement. In a corresponding manner, a portion 16 of the housing 1 adjacent to the ribbed end 5a, 15 of the cover 5 is also ribbed.

As is also shown in FIG. 2, the actuator 8 is provided with a stop pin 17, and the guide piece 9 is provided with two stops 18, 19 offset by 90° to limit the pivoting movement of the shut-off mechanism 6. [In FIG. 2, the sealing cover 5 is the indicated only by the dotted line 5'.] All of the other housing components are preferably manufactured from a strong and resistant plastic. The opening and closing of the water shut-off mechanism 6 is facilitated, after the sealing cover 5 has been unscrewed, by installing the operating tool 14 on the spigot 8a of the actuator 8, and appropriately pivoting the latter by 90°, using the sealing cover 5 as the operating tool.

The invention as described hereinabove in the context of the preferred embodiment is not to be taken as limited to all of the provided details thereof, since modifications and variations thereof may be made without departing from the spirit and scope of the invention.

What is claimed is:

1. A piping connector adapted for connection to a pipe, said piping connector comprising:
   an extension member, said extension member having a throughgoing passage, said throughgoing passage terminating in first and second external openings in said extension member;
   connection means for connecting said extension member to a pipe and thereby engaging said throughgoing passage in fluid communication with the pipe through said first external opening;
   alterable flow means for altering the flow of fluid through said throughgoing passage;
   removable cover member means, attachable to and detachable from said extension member, for substantially covering said alterable flow means when said cover member means is attached to said extension member; and
   an actuation member actuable from the exterior of said extension member to actuate said alterable flow means;
   said removable cover member means comprising an integral actuation driver for engaging and actuating said actuation member upon detachment of said removable cover means from said extension member.

2. The piping connector according to claim 1, wherein said cover member means additionally covers said second external opening when said cover member means is attached to said extension member.

3. The piping connector according to claim 2, wherein said extension member comprises a housing member having a first throughgoing bore, one end of said first throughgoing bore terminating in said first external opening, and an outlet member having a second throughgoing bore, one end of said second throughgoing bore terminating in said second external opening, said housing member and said outlet member being interconnected such that said first and second bores interconnect and form said throughgoing passage.

4. The piping connector according to claim 3, wherein said alterable flow means comprises a ball valve.

5. The piping connector according to claim 3, wherein said alterable flow means comprises a ball valve, and wherein said second throughgoing bore is eccentrically positioned with respect to said first throughgoing bore.

6. The piping connector according to claim 1, wherein said cover member means additionally covers said second external opening when said cover member means is attached to said extension member.

7. The piping connector according to claim 6, wherein said alterable flow means comprises a ball valve.

8. The piping connector according to claim 1, wherein said extension member comprises a housing member having a first throughgoing bore, one end of said first throughgoing bore terminating in said first external opening, and an outlet member having a second throughgoing bore, one end of said second throughgoing bore terminating in said second external opening, said housing member and said outlet member being interconnected such that said first and second bores interconnect and form said throughgoing passage.

9. The piping connector according to claim 8, wherein said alterable flow means comprises a ball valve, and wherein said second throughgoing bore is eccentrically positioned with respect to said first throughgoing bore.

10. The piping connector according to claim 9, wherein said alterable flow means comprises a ball valve.

11. The piping connector according to claim 11, wherein said outlet member has a relatively thicker wall portion due to said eccentrical positioning and wherein said alterable flow means comprises guide insert members mounted in said relatively thicker wall portion.

12. The piping connector according to claim 11, wherein said outlet member also has a relatively thinner wall portion due to said eccentricity and further comprising additional guide insert members for guiding said ball valve mounted in said relatively thinner wall portion.

13. The piping connector according to claim 12, further comprising a first sealing member mounted adjacent said first external opening and a second sealing member positioned between said second external opening and said cover member means when said cover member means is attached to said extension member.

14. The piping connector according to claim 1, wherein said extension member comprises a housing member having a first throughgoing bore, one end of said first throughgoing bore terminating in said first external opening, and an outlet member having a second throughgoing bore, one end of said second throughgoing bore terminating in said second external opening, said housing member and said outlet member being interconnected such that said first and second bores interconnect and form said throughgoing passage.

15. The piping connector according to claim 14, wherein said alterable flow means comprises a ball valve, and wherein said second throughgoing bore is eccentrically positioned with respect to said first throughgoing bore.

16. The piping connector according to claim 1, wherein said alterable flow means comprises a ball valve.

17. A piping connector adapted for connection to a pipe, said piping connector comprising:
   an extension member, said extension member having a throughgoing passage, said throughgoing passage terminating in first and second external openings in said extension member;

connection means for connecting said extension member to a pipe and thereby engaging said throughgoing passage in fluid communication with the pipe through said first external opening;

alterable flow means for altering the flow of fluid through said throughgoing passage;

removable cover member means, attachable to and detachable from said extension member, for substantially covering said alterable flow means when said cover member means is attached to said extension member; and an actuation member actuable from the exterior of said extension member to actuate said alterable flow means;

said removable cover member means comprising an integral actuation driver for engaging and actuating said actuation member upon detachment of said removable cover means from said extension member; and said removable cover member means additionally covering said second external opening when said removable cover member means is attached to said extension member.

18. A piping connector adapted for connection to a pipe, said piping connector comprising:

an extension member, said extension member having a throughgoing passage, said throughgoing passage terminating in first and second external openings in said extension member;

connection means for connecting said extension member to a pipe and thereby engaging said throughgoing passage in fluid communication with the pipe through said first external opening;

alterable flow means for altering the flow of fluid through said throughgoing passage;

removable cover member means, attachable to and detachable from said extension member, for substantially covering said alterable flow means when said cover member means is attached to said extension member; and an actuation member actuable from the exterior of said extension member to actuate said alterable flow means;

said removable cover member means comprising an integral actuation driver for engaging and actuating said actuation member upon detachment of said removable cover means from said extension member; and said removable cover member means additionally covering said second external opening when said removable cover member means is attached to said extension member, wherein said extension member comprises a housing member having a first throughgoing bore, one end of said first throughgoing bore terminating in said first external opening, and an outlet member having a second throughgoing bore, one end of said second throughgoing bore terminating in said second external opening, said housing member and said outlet member being interconnected such that said first and second bores interconnect and form said throughgoing passage.

* * * * *